US012715572B2

(12) United States Patent
Neuman et al.

(10) Patent No.: US 12,715,572 B2
(45) Date of Patent: Aug. 25, 2026

(54) SYSTEMS AND METHODS FOR FUSELAGE STABILIZATION IN A FREE-WING AIRCRAFT

(71) Applicant: Toyota Motor Engineering & Manufacturing North America, Inc., Plano, TX (US)

(72) Inventors: Tom M. Neuman, Fairfax, VA (US); Matthew M Warren, Silver Spring, MD (US); Frank K. Kozel, Glen Burnie, MD (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 233 days.

(21) Appl. No.: 18/334,777

(22) Filed: Jun. 14, 2023

(65) Prior Publication Data

US 2024/0417058 A1 Dec. 19, 2024

(51) Int. Cl.
*B64C 3/40* (2006.01)

(52) U.S. Cl.
CPC .................................... *B64C 3/40* (2013.01)

(58) Field of Classification Search
CPC ................................. B64C 3/40; B64C 3/385
See application file for complete search history.

(56) References Cited

U.S. PATENT DOCUMENTS 3,995,393 A * 12/1976 Patterson ............... A63H 27/00 446/66
5,340,057 A * 8/1994 Schmittle ................ B64C 29/02 244/7 B
5,395,073 A * 3/1995 Rutan ..................... B64C 29/02 244/38

(Continued)

FOREIGN PATENT DOCUMENTS

| | | | |
|---|---|---|---|
| JP | 2007261414 | A | 10/2007 |
| KR | 20150058197 | A | 5/2015 |
| WO | 2022/169828 | A1 | 8/2022 |

OTHER PUBLICATIONS

Haviland et al, "Dynamic Modeling and Analysis of a VTOL Freewing Concept", American Institute of Aeronautics and Astronautics, Jan. 1, 2016.

(Continued)

*Primary Examiner* — Donald J Wallace
*Assistant Examiner* — Jalal C Coduroglu
(74) *Attorney, Agent, or Firm* — Christopher G. Darrow; Darrow Mustafa PC

(57) ABSTRACT

Systems, methods, and other embodiments described herein relate to controlling aircraft elevons to stabilize a free-wing aircraft fuselage. In one embodiment, a system includes a processor and a memory storing machine-readable instructions. The instructions, when executed by the processor, cause the processor to 1) measure a fuselage pitch attribute of an aircraft, wherein a fuselage and wing assembly of the aircraft freely rotate about a pitch axis of the aircraft (Continued)

independently of one another, 2) measure a wing pitch angle of the wing assembly, and 3) control an angle of an elevon of the wing assembly based on the fuselage pitch attribute and the wing pitch angle.

20 Claims, 7 Drawing Sheets

(56) References Cited

U.S. PATENT DOCUMENTS

| | | | | |
|---|---|---|---|---|
| 5,509,623 | A * | 4/1996 | Schmittle | B64C 3/385 244/113 |
| 5,769,359 | A | 6/1998 | Rutan et al. | |
| 7,506,837 | B2 | 3/2009 | Parks | |
| 10,370,100 | B2 | 8/2019 | Rothhaar et al. | |
| 10,450,062 | B1 * | 10/2019 | Bova | B64U 30/10 |
| 10,589,838 | B1 | 3/2020 | Suppes | |
| 2003/0085319 | A1 * | 5/2003 | Wagner | B64C 27/20 244/12.3 |
| 2007/0029440 | A1 * | 2/2007 | Shepshelovich | B64U 10/25 244/190 |
| 2010/0301168 | A1 * | 12/2010 | Raposo | B64C 27/82 244/171.2 |
| 2011/0266081 | A1 * | 11/2011 | Novikov-Kopp | B60V 1/08 114/272 |
| 2015/0060601 | A1 * | 3/2015 | Nakagawa | B64C 13/505 244/99.2 |
| 2015/0197335 | A1 * | 7/2015 | Dekel | B64U 30/10 701/5 |
| 2018/0370624 | A1 * | 12/2018 | Seale | B64C 29/0033 |
| 2019/0233099 | A1 | 8/2019 | Lindsey et al. | |
| 2019/0291859 | A1 * | 9/2019 | Manning | B64C 29/0033 |
| 2020/0023960 | A1 * | 1/2020 | Taylor | B64C 29/0025 |
| 2021/0132103 | A1 * | 5/2021 | Petillon | G01P 5/02 |
| 2021/0331791 | A1 * | 10/2021 | Geuther | B64C 29/0025 |
| 2021/0362857 | A1 * | 11/2021 | McCullough | B64C 11/306 |
| 2022/0075390 | A1 * | 3/2022 | Tanaka | G05D 1/0011 |
| 2022/0089279 | A1 * | 3/2022 | Rosen | B64U 50/23 |
| 2022/0363376 | A1 | 11/2022 | Dolejsi | |
| 2024/0417058 | A1 * | 12/2024 | Neuman | B64C 3/385 |

OTHER PUBLICATIONS

Axten et al, "Stabilizing a VTOL Freewing Testbed Vehicle in Hover", American Institute of Aeronautics and Astronautics, Jan. 5, 2020.

Axten et al, "VTOL Freewing Testbed Vehicle in Hover and Forward Flight", American Institute of Aeronautics and Astronautics, Jan. 4, 2021.

Chen et al, "A Wind Tunnel Test of a Tilt-body Freewing Aircraft Including Thrust Effects", American Institute of Aeronautics and Astronautics, 1995.

Freewing Aerial Robotics Corp., "Briefing Slides", Commercial Communications & Military Reconnaissance Systems. (52 pages).

Colugo, "Models—Colugo", Retrieved from the Internet: <https://www.colugo-sys.com/models/>, retrieved Jun. 14, 2023. (7 pages).

Aero News Network, "Aurora Flight Sciences Celebrates 100th GoldenEye-50 Flight", Retrieved from the Internet: <http://www.aero-news.net/index.cfm?do=main.textpost&id=6bf6c3a4-994b-4868-87e4-924be9ce8789>, retrieved Jan. 23, 2023. (1 page).

International Search Report and Written Opinion for International Application No. PCT/US2023/076429, mailed on Mar. 7, 2024 (11 pages).

Axten et al. "VTOL Freewing Design and Adaptive Controller Development," AIAA SciTech 2023 Forum. 2023.

Youtube. "Freewing without Mechanical Hinge Damping (Dec. 2022)," Retrieved from the Internet: <https://youtu.be/xZovOektGh8?si=_ekHA41KhSEKTx6f>, Retrieved Apr. 23, 2024.

Youtube. "Freewing with Mechanical Hinge Damping," Retrieved from the Internet: <https://youtu.be/291h-gU9S-Q?si=0OAXubmEksjH6wPh>, Retrieved Apr. 23, 2024.

Youtube. "Multi-Outer Loop Initial Flight Demonstration for a VTOL Free-Wing Aircraft," Retreived from the Internet: <https://youtu.be/Tip8mjS8cVM?si=dZFgqjDfKTtmvBSt>, Retrieved Apr. 23, 2024.

* cited by examiner

SYSTEMS AND METHODS FOR FUSELAGE STABILIZATION IN A FREE-WING AIRCRAFT

TECHNICAL FIELD

The subject matter described herein relates, in general, to free-wing aircraft and, more particularly, to stabilizing the fuselage of a free-wing aircraft when in a vertical flight mode.

BACKGROUND

In an airplane, lift is created as air travels over the wing while the airplane moves forward. As such, an airplane must be moving in a horizontal direction to remain aloft. In a helicopter, lift is created by a horizontal rotating propeller. As such, a helicopter has the capability of vertical takeoff and landing (VTOL) and can hover in the air. However, a helicopter cannot travel as fast as an airplane in a horizontal direction. A free-wing aircraft combines the forward flight aspects of a fixed-wing aircraft, i.e., an airplane, with the VTOL and hover capability of a helicopter.

A free-wing aircraft has wings that pivot independently from the fuselage about the pitch axis of the aircraft. This is facilitated by connecting the wings and the fuselage via bearings or bushings that pivot freely, i.e., with minimal mechanical friction or damping, in pitch. All other degrees of freedom (roll, yaw, heave, sway, surge) are rigidly connected between the fuselage and wing. Propellers may be attached to the wings to drive the free-wing aircraft. When the wings are horizontal, the propellers push the free-wing aircraft forward for horizontal flight. When the wings are vertical, the propellers enable vertical flight. The combination of a vertical flight mode and a horizontal flight mode creates an aircraft with the low infrastructure demand of helicopters and the efficiency of airplanes. In general, enhanced VTOL free-wing operation allows for more effective and broader use of such aircraft.

SUMMARY

In one embodiment, example systems and methods relate to a manner of improving the fuselage stabilization of aircraft for which the fuselage and wings pivot independently about the pitch axis, i.e., a free-wing aircraft.

In one embodiment, an elevon control system for enhancing free-wing fuselage stability is disclosed. An elevon is a movable device mounted on the trailing edge of a wing. An elevon combines the operations of an airplane elevator for pitch control and an airplane aileron for roll control. The elevon control system includes one or more processors and a memory communicably coupled to the one or more processors. The memory stores instructions that, when executed by the one or more processors, cause the one or more processors to measure a fuselage pitch attribute of an aircraft. The fuselage and wing assembly of the aircraft freely rotate about a pitch axis of the aircraft independently of one another. The memory further stores instructions that, when executed by the one or more processors, cause the one or more processors to measure a wing pitch angle of the wing assembly and control an angle of an elevon of the wing assembly based on the fuselage pitch attribute and the wing pitch angle.

In one embodiment, a non-transitory computer-readable medium for enhancing free-wing fuselage stability and including instructions that, when executed by one or more processors, cause the one or more processors to perform one or more functions is disclosed. The instructions include instructions to measure a fuselage pitch rate or angle of an aircraft while in a vertical flight mode. The fuselage and wing assembly of the aircraft freely rotate about a pitch axis of the aircraft independently of one another. The instructions include instructions to measure a wing pitch angle of the wing assembly and adjust a wing assembly pitch by controlling an angle of an elevon of the wing assembly based on the fuselage pitch attribute and the wing pitch angle. An adjustment of the wing assembly pitch dampens the fuselage pitch rate.

In one embodiment, a method for controlling an elevon to stabilize a free-wing fuselage is disclosed. In one embodiment, the method includes measuring a fuselage pitch attribute of an aircraft. The fuselage and wing assembly of the aircraft freely rotate about a pitch axis of the aircraft independently of one another. The method also includes measuring the wing pitch angle of the wing assembly and controlling an angle of an elevon of the wing assembly based on the fuselage pitch attribute and the wing pitch angle. The control stabilizes the wing and the fuselage when the aircraft is in the vertical flight mode.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
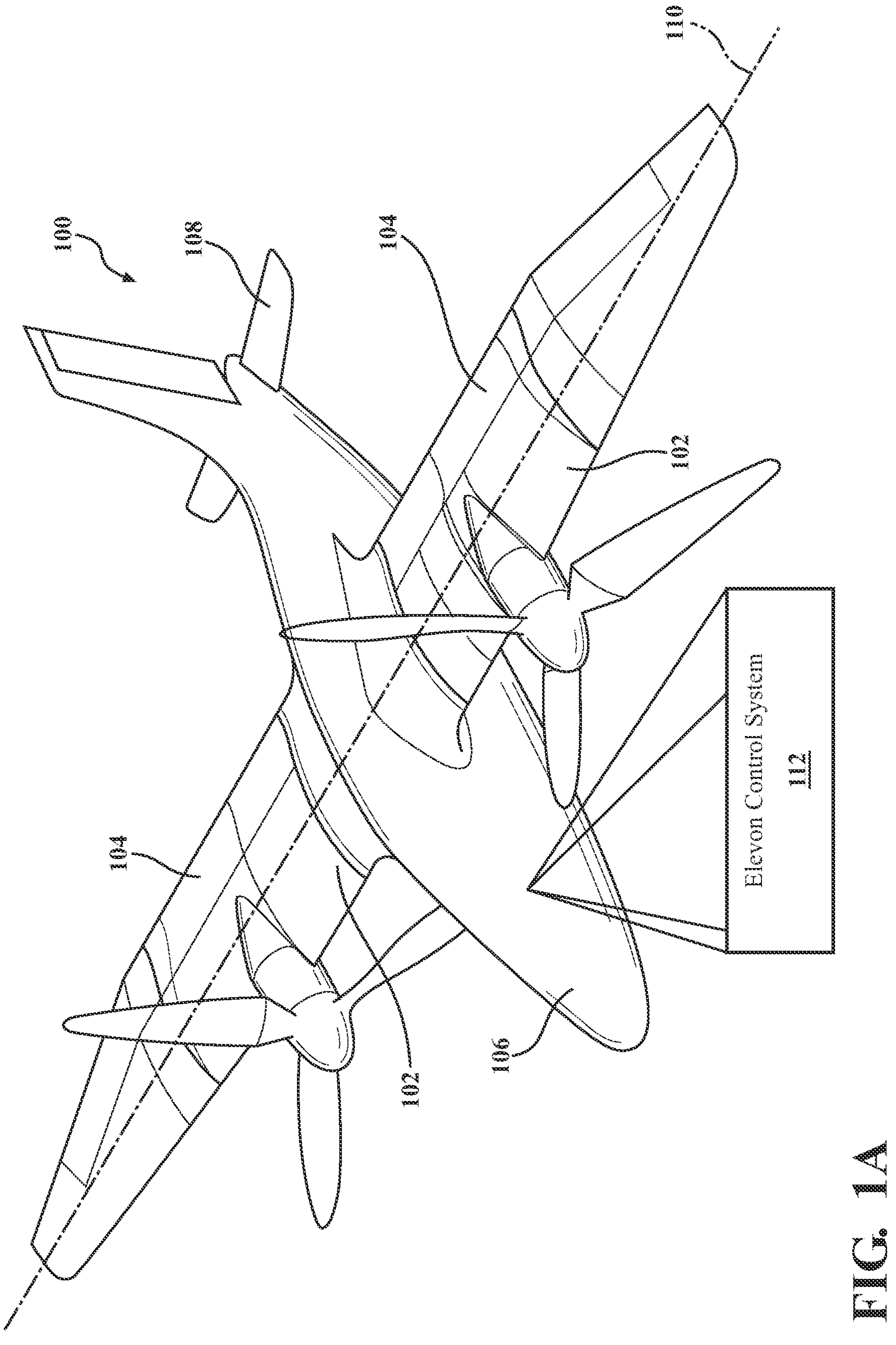
FIGS. 1A and 1B illustrate one embodiment of a free-wing aircraft within which systems and methods disclosed herein may be implemented.

Systems, methods, and other embodiments associated with improving free-wing aircraft operation are disclosed herein. As previously described, helicopters and airplanes are aircraft with different functionalities. Some aircraft attempt to combine the functionality of helicopters and airplanes into a single aircraft. For example, some hovering aircraft add parts or actuators to enable forward flight. Tiltrotor and tilt-wing aircraft actuate the thrust line of two rotors from vertical to horizontal. Other aircraft add a horizontal thruster separate from the vertical rotors. Multicopters with six or more rotors are another example and are tolerant of partial powerplant failures. Some aircraft combine some or all of the above features into VTOL aircraft with many propulsors. The above approaches increase part count, often increase aircraft weight and drag, and may sacrifice system reliability.

A free-wing aircraft is an example of an aircraft with the functionality of both helicopters and airplanes (i.e., it is a VTOL aircraft capable of horizontal and vertical flight) with a reduced part count and weight compared to other solutions. A free-wing aircraft is one in which a wing and fuselage rotate and pivot independently about a pitch axis. The wing and fuselage are connected via bearings or bushings. The wing and fuselage are free to pivot relative to each other and the ground in the pitch axis.

By contrast, a tilt-wing aircraft uses an actuator to rigidly control the angle between the wing and fuselage. As described herein, the free-wing aircraft does not include a wing actuator, thereby reducing weight and eliminating a critical failure point. A tail-sitter aircraft has a wing and fuselage that are permanently attached at a fixed angle; thus, no actuator is required. In a tail-sitting aircraft, the fuselage is in a nearly vertical orientation for takeoff and landing. A free-wing aircraft fuselage as described herein, can remain generally level in all phases of flight.

Compared to tilt-wing and tail-sitter aircraft, flight control in a free-wing aircraft is achieved through wing attitude independent of the fuselage pitch attitude. This independence of the wing decreases inertia on the pitch axis by 80-90%, allowing very rapid pitch control. The decrease in inertia is due to the proportionality between inertia, mass, and the square of the mass distance from an axis ($I=md^2$). Masses in a laterally elongated (left-right) wing tend to be near the pitch axis. In contrast, masses in a longitudinally elongated (fore-aft) fuselage tend to be far from the pitch axis. Also, the wing mass of a free-wing aircraft can be light with just the fuselage, four actuators (motors and control surfaces), and an inertial measurement unit. Heavy items such as payload, batteries and/or fuel, electronics systems, etc., can be attached to the fuselage.

While providing an aircraft capable of horizontal flight and hovering expands the capability of the aircraft, achieving such is challenging for several reasons. For example, during the forward horizontal flight, the fuselage of a free-wing aircraft is passively stabilized in the pitch axis as air flows over a horizontal stabilizer on a tail assembly. However, during hovering or vertical flight, there is no airflow over the horizontal stabilizer; thus, the fuselage is not passively stabilized in the pitch axis. Fuselage motion in vertical/hovering flight ranges from a minor nuisance to a significant hindrance to mission performance. In some cases, the fuselage pitch may vary in an upward or downward direction in an unbounded fashion. The change in pitch angle negatively affects flight controls. That is, it is difficult to control an aircraft when the mass of the aircraft, i.e., the fuselage, is constantly shifting position and altering the response of the aircraft to pilot commands.

The change in pitch attitude also affects sensor performance. That is, a free-wing aircraft may be mounted with various sensors and/or cameras. The swing of a fuselage negatively impacts the performance and output of these various sensors and/or cameras. For example, a fuselage may include a laser altimeter or any other type of altimeter, which records the precise altitude of the aircraft. The measurements from the altimeter are used for various functions, such as landing and vertically navigating the aircraft. A variation of the position of the sensor resulting from fuselage swing, such as that described above, makes it difficult to perform certain operations, such as precisely landing the aircraft gently without damaging the aircraft or any payload.

As another example, a camera of the free-wing aircraft may be relied on to take high-resolution images and/or video of an area below the free-wing aircraft, for example, to locate an injured individual during a search and rescue mission. A swinging aircraft reduces the ability of the camera to provide clear and in-focus images and/or videos.

Accordingly, the present specification describes an aircraft capable of hovering and vertical flight like a helicopter and forward flight like an airplane with a low quantity of parts, reduced actuator count, reduced aerodynamic drag, and a stabilized fuselage during flight. Specifically, the present specification describes an elevon control system that stabilizes the fuselage while in a vertical flight mode via a closed wing control loop using a fuselage pitch sensor. Any pitching motion of the fuselage is canceled by rotating the wing forward or back.

As described above, the wing is stabilized by adjusting the elevons on the trailing edge of the wing, which are in the blown wash generated by the propeller. Wing stabilization is accomplished by closed-loop control of the wing pitch attitude. The high maneuverability of the wing can also be used to stabilize the fuselage. This is accomplished by introducing a fuselage pitch rate or attitude error term to the wing control loop. Fuselage stabilization is therefore added to the wing stabilization task.

While the systems and methods described herein presume that the fuselage center of gravity is located at some vertical distance from the wing pivot axis to avoid a natural flipping tendency, the systems and methods can also stabilize an aircraft with a high center of gravity.

In this way, the disclosed systems, methods, and other embodiments improve free-wing aircraft fuselage stabilization while reducing part count, weight, and drag as compared to other configurations. Specifically, wing pitch attitude is controlled using actuated control surfaces (e.g., elevons) immersed in propeller airflow. The fuselage does not require active stabilization devices and may hang freely. As such, the free-wing aircraft described herein achieves hover control and forward flight while keeping a minimum of four actuators: two motors and two control surfaces.

As used in the present specification and the appended claims, the term "vertical flight mode" refers to a mode of the aircraft where the pitch angle of the wing assembly is generally perpendicular to the horizon. Vertical flight mode encompasses VTOL, flying vertically (i.e., up and down) and hovering.

Further, as used in the present specification and the appended claims, the term "horizontal flight mode" refers to a mode of the aircraft where the pitch angle of the wing assembly is generally parallel to the horizon.

Still further, as used in the present specification and in the appended claims, the term "elevon" refers to a movable device mounted on the trailing edge of a wing. An elevon combines the functionality of an airplane elevator for pitch control and an airplane aileron for roll control.

Figure 1B:
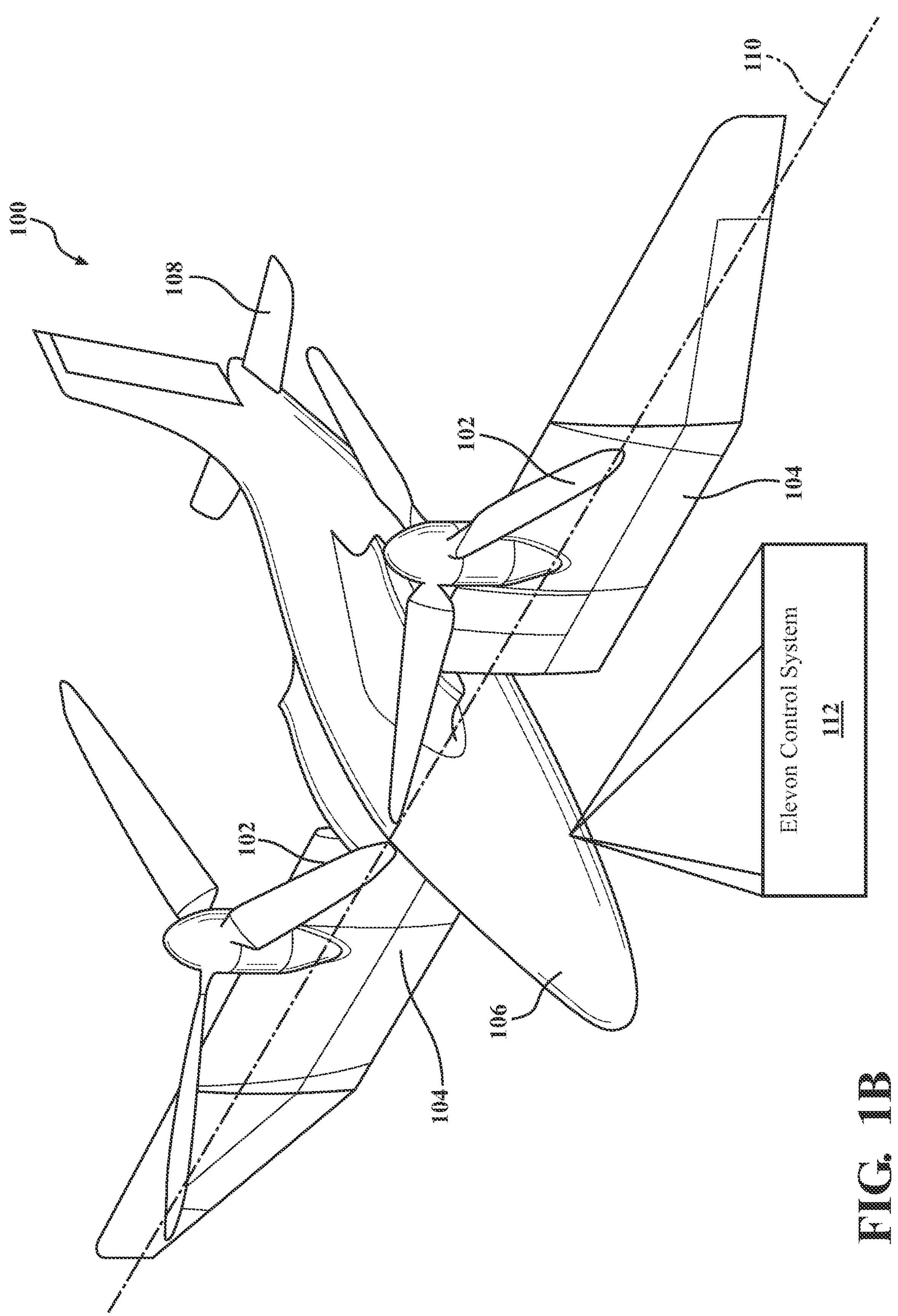

Referring to FIGS. 1A and 1B, an example of an aircraft 100 within which the systems and methods disclosed herein is illustrated. The aircraft 100 is a free-wing aircraft in which the wing assembly (including both wings 102) rotates independently of the fuselage 106 of the aircraft 100. Some of the possible elements of the aircraft 100 are shown in FIGS. 1A and 1B and will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the aircraft 100 includes an elevon control system 112 that is implemented to perform methods and other functions as disclosed herein relating to improving fuselage stabilization during vertical flight and/or hovering flight.

The aircraft 100 includes a fuselage 106, or body, in which mechanical, electrical, and/or control systems are housed. As described above, the aircraft 100 may have a variety of uses and the flight control components and components specific to the particular use may be housed within the fuselage 106. As a particular example, the aircraft 100 may be unmanned. In this case, the fuselage 106 houses a communication system for receiving and executing commands from a remote operator. In another example, the aircraft 100 is locally operated by a pilot on board the aircraft 100. In this example, the fuselage 106 includes a cockpit where the pilot sits to control the aircraft 100.

The aircraft 100 also includes wings 102 pivotably coupled to the fuselage 106. The wings 102 in combination are referred to as a wing assembly. As described above, the wings 102 rotate or pivot independently from the fuselage 106 about a pitch axis 110 of the aircraft 100. As such, the wings 102 and fuselage 106 are coupled together via bearings or bushings that pivot freely, i.e., with minimal mechanical friction or damping, in pitch. In one example, the wings 102 are rigidly coupled to one another such that the entire wing assembly rotates as a single unit independently of the fuselage 106. In another example, each wing 102 is independently rotatable about the pitch axis 110 relative to the other wing and the fuselage 106.

Wing pitch is controlled by elevons 104. The elevons 104 are control surfaces attached to the wings 102 that are in the air wash of the propellers that drive the aircraft 100. By adjusting the pitch of the elevons 104 relative to a length dimension of the wing 102, the profile of the wing 102 changes. As used in the present specification and the appended claims, the length dimension of the wing refers to a dimension extending from the leading edge of the wing 102 to the trailing edge of the wing 102. The change to the profile of the wing 102 alters airflow over the wing 102, creates a pitching moment, and alters the pitch angle of the wing assembly. As described above, the aircraft 100 is capable of horizontal or forward flight as depicted in FIG. 1A and vertical/hover flight as depicted in FIG. 1B. Switching between the two modes is performed by changing the airflow dynamics over the wings 102, i.e., changing the elevon 104 angle relative to the length dimension of the wing 102.

Figure 3:
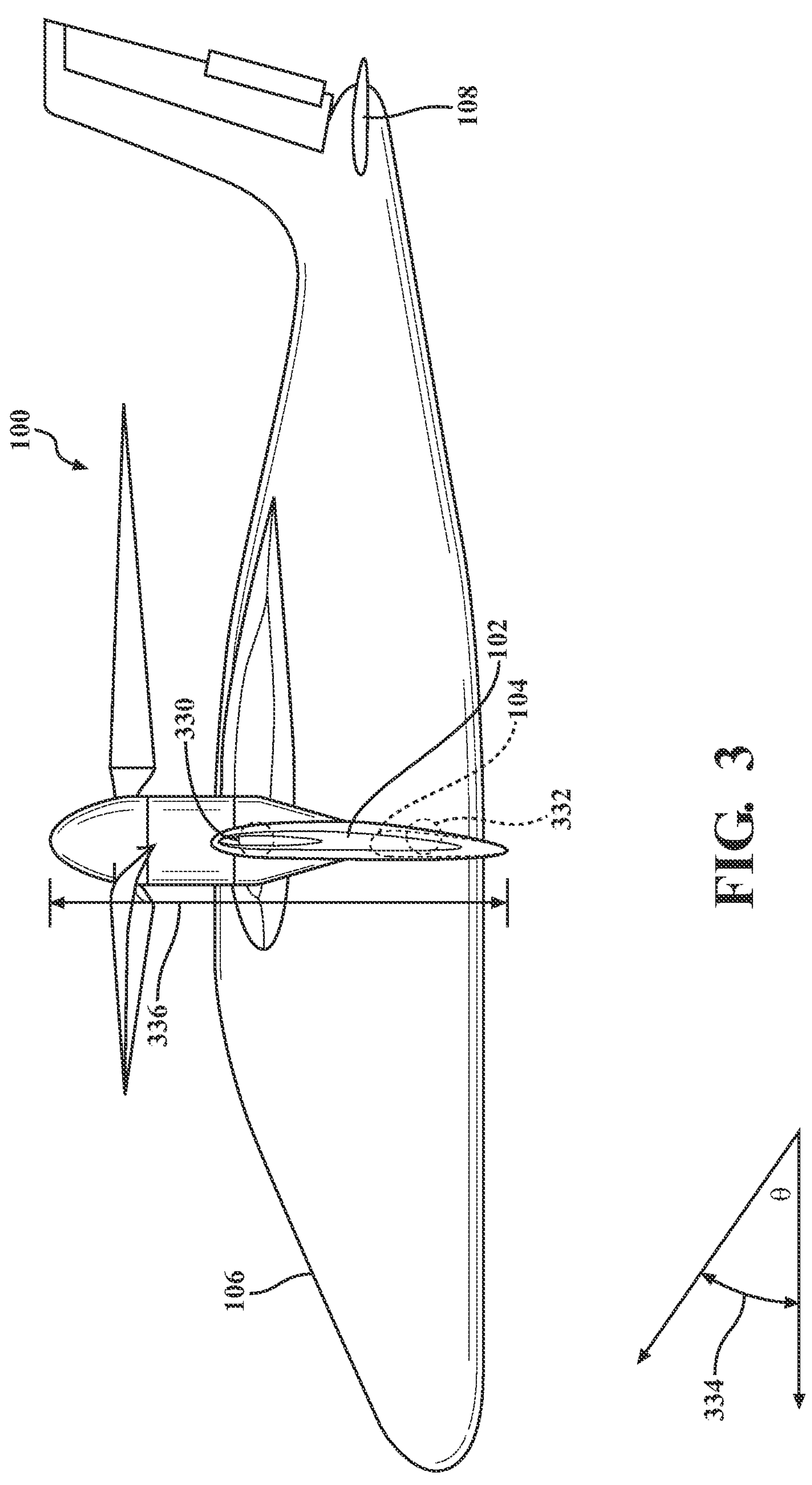
FIG. 3 illustrates one embodiment of elevon control of a free-wing aircraft to stabilize the free-wing aircraft fuselage.
Figure 4:
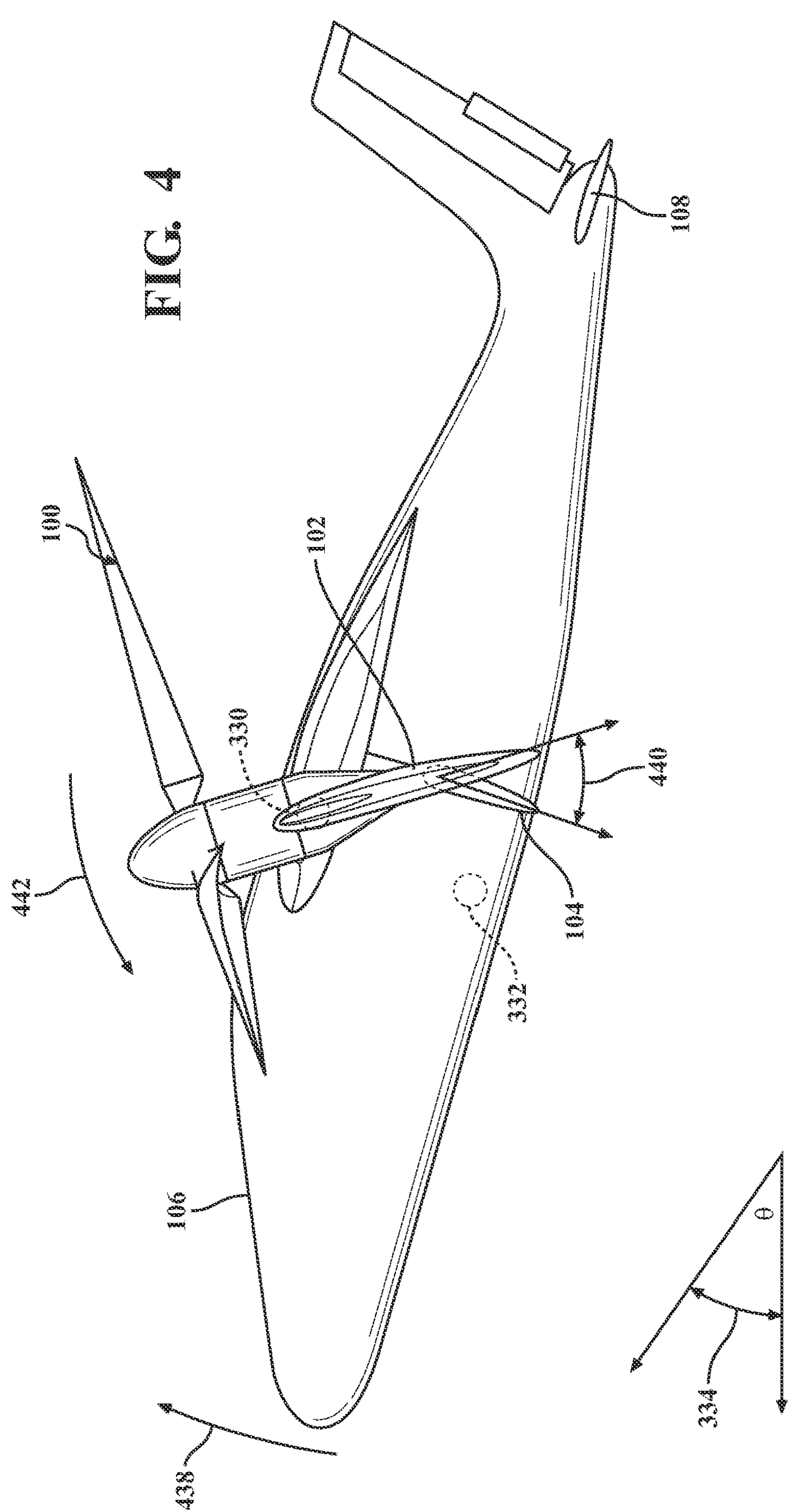
FIG. 4 illustrates one embodiment of elevon control of a free-wing aircraft to stabilize the free-wing aircraft fuselage.
Figure 5:
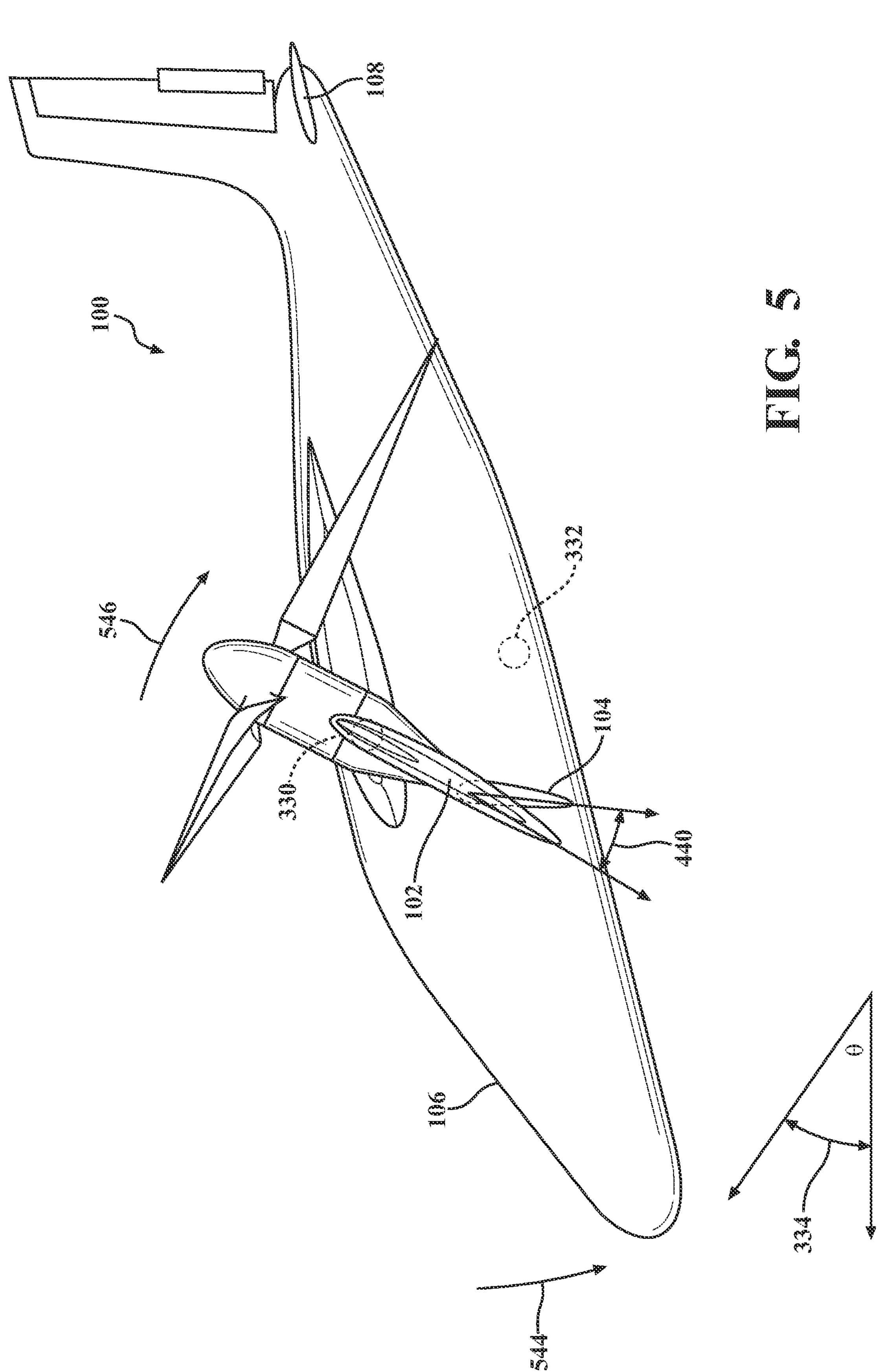
FIG. 5 illustrates one embodiment of elevon control of a free-wing aircraft to stabilize the free-wing aircraft fuselage.

The aircraft 100 also includes a horizontal stabilizer 108 that stabilizes the fuselage 106 during horizontal or forward flight. However, as described above, when in a vertical flight mode (e.g., during VTOL, vertical flight, and hovering) as depicted in FIG. 1B, there is no airflow over the horizontal stabilizer 108 such that the fuselage 106 is not passively stabilized when in the vertical flight mode. Accordingly, the aircraft 100 includes an elevon control system 112 that not only controls and stabilizes the wings 102 in forward and vertical flight, but also controls the elevons 104 to stabilize the fuselage 106 while in vertical flight. That is, the elevons 104 of the aircraft 100 may be positioned to offset a swing of the fuselage 106. Examples of elevon 104 control to offset, or cancel, swinging of the fuselage 106 are depicted in FIGS. 3-5.

Figure 2:
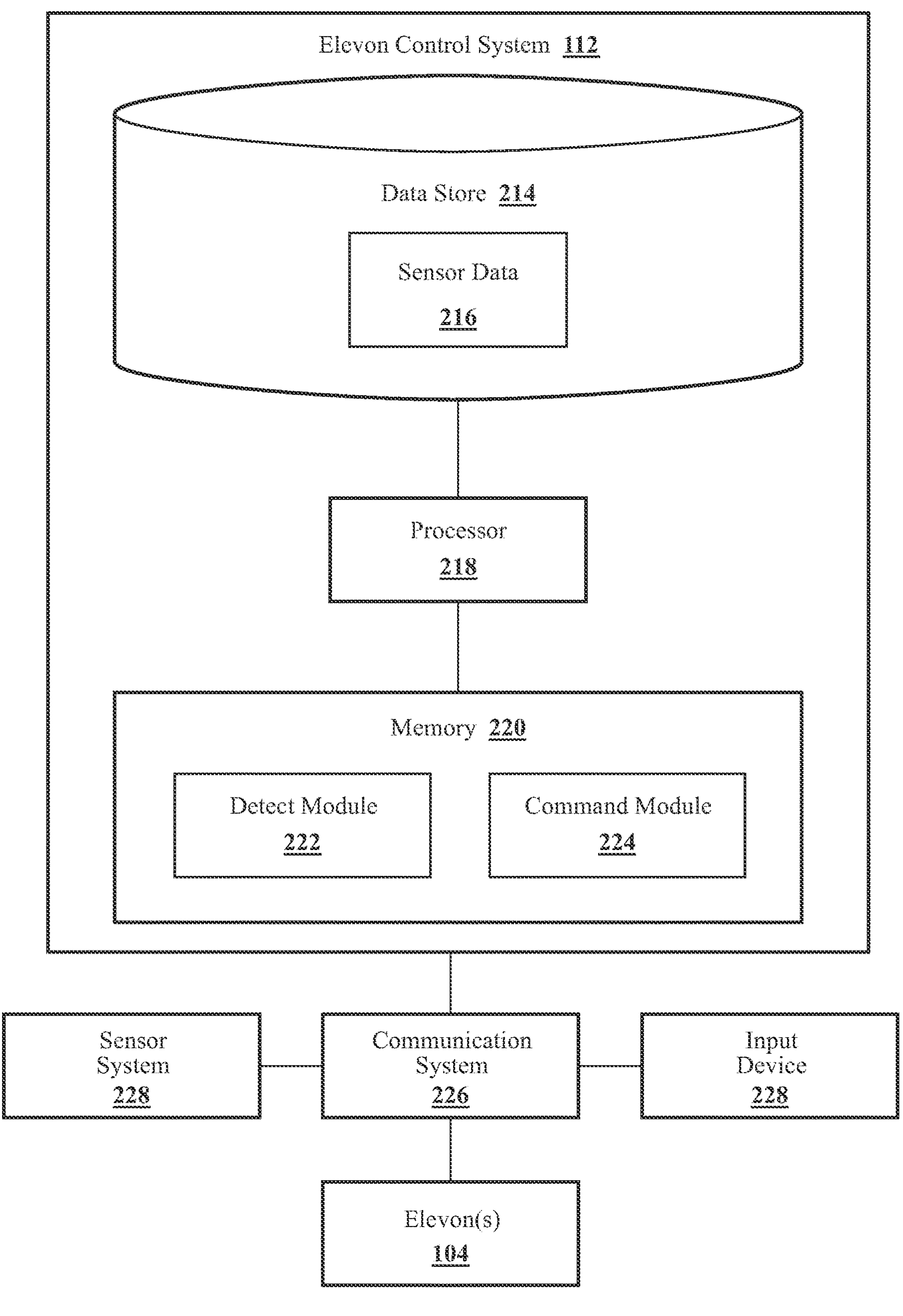
FIG. 2 illustrates one embodiment of an elevon control system that is associated with stabilizing a free-wing aircraft fuselage.

FIG. 2 illustrates one embodiment of an elevon control system 112 that stabilizes a free-wing aircraft fuselage 106. The elevon control system 112 is shown as including a processor 218. In one or more arrangements, the processor(s) 218 can be a primary/centralized processor of the aircraft 100 or may be representative of many distributed processing units. For instance, the processor(s) 218 can be an electronic control unit (ECU). Alternatively, or additionally, the processors include a central processing unit (CPU), a graphics processing unit (GPU), an application-specific integrated circuit (ASIC), a microcontroller, a system on a chip (SoC), and/or other electronic processing units that support operation of the aircraft 100.

The processor 218 may be a part of the elevon control system 112, the elevon control system 112 may include a separate processor from the processor 218 of the aircraft 100, or the elevon control system 112 may access the processor 218 through a data bus or another communication path that is separate from the aircraft 100. In one embodiment, the elevon control system 112 includes a memory 220 that stores a detect module 222 and a command module 224. The memory 220 is a random-access memory (RAM), read-only memory (ROM), a hard-disk drive, a flash memory, or another suitable memory for storing the modules 222 and 224. The modules 222 and 224 are, for example, computer-readable instructions that, when executed by the processor 218, cause the processor 218 to perform the various functions disclosed herein. In alternative arrangements, the modules 222 and 224 are independent elements from the memory 220 that are, for example, comprised of hardware elements. Thus, the modules 222 and 224 are alternatively ASICs, hardware-based controllers, a composition of logic gates, or another hardware-based solution.

Moreover, in one embodiment, the elevon control system 112 includes the data store 214. The data store 214 can be comprised of volatile and/or non-volatile memory. Examples of memory that may form the data store 214 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drives (SSDs), and/or other non-transitory electronic storage medium. In one configuration, the data store 214 is a component of the processor(s) 218. In general, the data store 214 is operatively connected to the processor(s) 218 for use thereby. The term "operatively connected," as used throughout this description, can include direct or indirect connections, including connections without direct physical contact.

The data store 214 is, in one embodiment, an electronic data structure stored in the memory 220 or another data storage device and that is configured with routines that can be executed by the processor 218 for analyzing stored data, providing stored data, organizing stored data, and so on. Thus, in one embodiment, the data store 214 stores data used by the modules 222 and 224 in executing various functions. In one embodiment, the data store 214 stores the sensor data 216 along with, for example, metadata that characterizes various aspects of the sensor data 216. In one or more arrangements, the one or more data stores 214 include various data elements to support functions of the aircraft 100, such as vertical flight and horizontal flight. Thus, the data store 214 may store map data and/or sensor data 216. The map data includes, in at least one approach, maps of one or more geographic areas.

The sensor data 216 is data provided from one or more sensors of the sensor system 228 of the aircraft 100. Thus, the sensor data 216 may include observations of a surrounding environment of the aircraft 100 and/or information about the aircraft 100 itself. As described herein, "sensor" means an electronic and/or mechanical device that generates an output (e.g., an electric signal) responsive to a physical phenomenon, such as electromagnetic radiation (EMR), sound, etc. The sensor system 228 and/or the one or more sensors can be operatively connected to the processor(s) 218, the data store(s) 214, and/or another element of the aircraft 100. In some instances, one or more data stores 214 located onboard the aircraft 100 store at least a portion of the map data and/or the sensor data 216. Alternatively, or in addition, at least a portion of the map data and/or the sensor data 216 can be located in one or more data stores 214 that are located remotely from the aircraft 100.

Various examples of different types of sensors will be described herein. However, it will be understood that the embodiments are not limited to the particular sensors described. In various configurations, the sensor system 228 includes one or more aircraft sensors and/or one or more environment sensors. The aircraft sensor(s) function to sense information about the aircraft 100 itself. In one or more arrangements, the aircraft sensor(s) include one or more pitch sensors, accelerometers, one or more gyroscopes, an inertial measurement unit (IMU), a global navigation satellite system (GNSS), a global positioning system (GPS), and/or other sensors for monitoring aspects of the aircraft 100.

As noted, the sensor system 228 can include one or more environment sensors that sense a surrounding environment (e.g., external) of the aircraft 100. For example, the one or more environment sensors sense objects in the surrounding environment of the aircraft 100. Such obstacles may be stationary objects and/or dynamic objects. Various examples of sensors of the sensor system 228 will be described herein. The example sensors may be part of the one or more environment sensors and/or the one or more aircraft sensors. However, it will be understood that the embodiments are not limited to the particular sensors described. As an example, in one or more arrangements, the sensor system 228 includes one or more fuselage pitch attribute sensors and wing pitch attribute sensors.

The sensor data 216 includes the output of a fuselage pitch sensor and indicates a variety of fuselage pitch attributes. For example, the fuselage pitch sensor may output a pitch angle of the fuselage 106, which is the angle of the longitudinal axis of the fuselage 106 relative to the horizon. In an example, the fuselage pitch sensor outputs a pitch rate of the fuselage 106, which is the rate of change of the pitch angle over time. In yet another example, the fuselage pitch sensor outputs both a pitch angle and a pitch rate of the fuselage 106. In either case, the output of the fuselage pitch sensor is stored in the sensor data 216 and used by the command module 224 in controlling the elevons 104 of the aircraft 100.

The sensor data 216 also includes an output of a wing pitch sensor. As with the fuselage pitch sensor, the wing pitch sensor outputs at least one of a wing pitch angle and a wing pitch rate. In either case, the output of the wing pitch sensor is stored in the sensor data 216 and used by the command module 224 in controlling the elevons 104 of the aircraft 100. In other words, the command module 224 relies on both the wing pitch attribute and the fuselage pitch attribute in controlling the elevons 104. As such, elevon control stabilizes the wing and fuselage when the aircraft 100 is in a vertical flight mode.

As described previously, the aircraft 100 can include one or more modules, at least some of which are described herein. In at least one arrangement, the modules are implemented as non-transitory computer-readable instructions that, when executed by the processor 218, implement one or more of the various functions described herein. In various arrangements, one or more of the modules are a component of the processor(s) 218, or one or more of the modules are executed on and/or distributed among other processing systems to which the processor(s) 218 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

The detect module 222, in one embodiment, includes instructions that cause the processor 218 to measure a fuselage pitch attribute of the aircraft 100 and measure a wing pitch angle of the wing assembly. Specifically, the detect module 222 generally includes instructions that function to control the processor 218 to receive data inputs from one or more sensors of the aircraft 100. The inputs are, in one embodiment, fuselage pitch attributes and wing pitch attributes. In different embodiments, the detect module 222 may receive different types or combinations of fuselage pitch attributes and wing pitch attributes. For example, the fuselage pitch attribute may be a fuselage pitch angle, which is an absolute angle of the longitudinal axis of the fuselage 106 relative to a horizon. In this example, the control of an angle of the elevon 104 of the wing 102 positions the fuselage 106 at a predetermined pitch angle. For example, it may be desirable to maintain the fuselage 106 at a 0-degree pitch, i.e., parallel to the horizon. In this example, the elevon 104 moves to maintain the fuselage 106 at a 0-degree pitch.

In another example, the fuselage pitch attribute is a fuselage pitch rate, or a rate of change of a fuselage 106 orientation with respect to a reference frame such as the horizon. In this example, the control of an angle of the elevon 104 of the wing 102 cancels a swing of the fuselage 106 when the aircraft 100 is in a vertical flight mode. That is, the elevons 104 dampen the pitch rate of the fuselage 106, decreasing the time for the fuselage 106 to reach an equilibrium position. In this case, fuselage pitch attitude is omitted in the elevon control loop such that the absolute pitch angle of the fuselage 106 may differ based on factors such as payload, etc. That is, for any number of reasons, it may be desirable that the stable position of the fuselage 106 is other than horizontal (e.g., some degree of nose-up or nose-down). When the fuselage pitch attribute is a fuselage pitch rate and not a fuselage pitch angle, the fuselage 106 may hold this non-horizontal stable pitch attitude. Similarly, the wing pitch attribute may be a wing pitch attitude, a wing pitch rate, or a combination thereof.

The detect module 222, in one embodiment, is further configured to perform additional tasks beyond controlling the respective pitch sensors to acquire and provide the sensor data 216. For example, the detect module 222 determines the flight mode of the aircraft 100. As described above, the aircraft 100 may be in a horizontal flight mode wherein the wing assembly has a relatively horizontal pitch angle. The aircraft 100 may also operate in a vertical flight mode, which encompasses situations where the aircraft is flying vertically (e.g., up or down) or is hovering at constant altitude. In general, fuselage stabilization via elevon control occurs while the aircraft 100 is in a vertical flight mode. That is, control of the angle of the elevon 104 stabilizes the fuselage 106 when the aircraft 100 is in a vertical flight mode and not when the aircraft 100 is in a horizontal flight mode. This is because fuselage stabilization via elevon control is unnecessary in horizontal flight mode as fuselage stabilization results from airflow over the horizontal stabilizer 108. Moreover, feeding the command module 224 with fuselage pitch attribute information during horizontal flight may introduce noise into the control of the elevon 104.

As such, the detect module 222, relying on sensor data 216 from the sensor system 228 of the aircraft 100, determines when the aircraft 100 is in a horizontal flight mode. When in a horizontal flight mode, control of the angle of the elevon 104 is based on the wing pitch angle without the fuselage pitch attribute. In other words, when in a vertical flight mode (e.g., hovering or vertical motion), elevon control is based on three inputs: 1) a fuselage pitch attribute, 2) a wing pitch attribute, and 3) a wing attitude command. By comparison, in horizontal flight mode, elevon control is based on two inputs: 1) a wing pitch attribute and 2) a wing attitude command.

Determining whether the aircraft 100 is in a horizontal flight mode may be done in a number of ways. In one example, the determination is made based on the airspeed of the aircraft 100. That is, airspeeds in horizontal flight are generally higher than airspeeds in vertical flight. Accordingly, when the airspeed of the aircraft 100 is greater than a predetermined value, the detect module 222 may determine that the aircraft 100 is in a horizontal flight mode and take appropriate action to ensure the elevon control is not based on the fuselage pitch attribute. Such appropriate action may include blocking/interrupting a transmission path between a fuselage pitch sensor and the command module 224 or altering operations of the command module 224 to ignore or not retrieve the fuselage pitch attribute information from the sensor data 216. To determine the airspeed of the aircraft 100, the sensor system 228 may include an airspeed sensor such as a pitot tube connected to a pressure transducer, a GPS, or any other sensor for determining the aircraft airspeed. In this example, the sensor data 216 may further include the threshold against which airspeed is compared to determine whether or not elevon-based fuselage stabilization is to be implemented.

In one example, the determination is made based on the pitch angle of the wing assembly of the aircraft 100. A wing assembly pitch angle in horizontal flight is generally less than a wing assembly pitch angle in vertical flight. Accordingly, when the pitch angle of the wing assembly is less than a predetermined value, the detect module 222 may determine that the aircraft 100 is in a horizontal flight mode and take appropriate action to ensure the elevon control is not based on the fuselage pitch attribute. Such appropriate action may include blocking/interrupting a transmission path between a fuselage pitch sensor and the command module 224 or altering operations of the command module 224 to ignore or not retrieve the fuselage pitch attribute information from the sensor data 216. In this example, the sensor data 216 may further include the threshold against which the wing pitch angle is compared to determine whether or not elevon-based fuselage stabilization is to be implemented.

Figure 6:
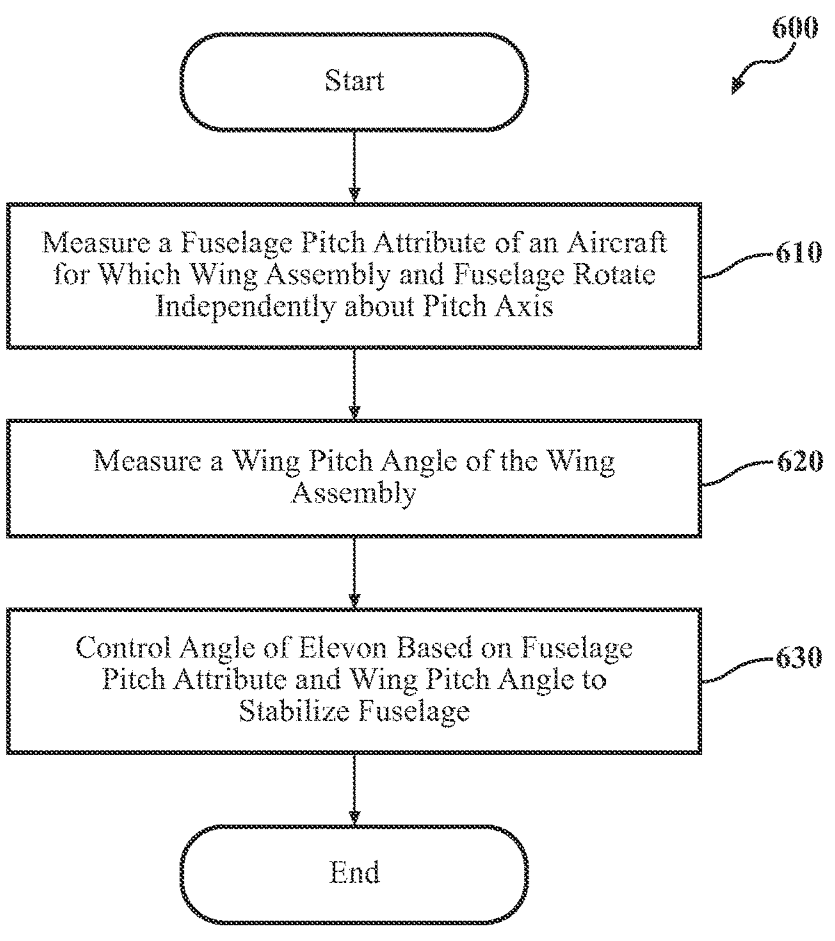
FIG. 6 illustrates a flowchart for one embodiment of a method that is associated with stabilizing a free-wing aircraft fuselage.

Both of the preceding examples describe a discrete disablement of the fuselage stabilization function by the elevons 104 once horizontal flight is achieved. In another example, the fuselage stabilization function may be gradually phased out as the wing 102 transitions from vertical to horizontal modes, as airspeed increases, or both. For example, the fuselage stabilization gain, as depicted in FIG. 6, may be multiplied by the trigonometric sine of the wing angle relative to the horizon, thus varying from a value of one in a vertical attitude to a value of zero in a horizontal attitude. In another example, the gain in FIG. 6 may be multiplied by a term proportional to airspeed, or airspeed raised to a mathematical exponent, such that the gain becomes zero above a predetermined airspeed.

As provided for herein, the detect module 222, in one embodiment, acquires sensor data 216 that includes pitch sensor data. In further arrangements, the detect module 222 acquires the sensor data 216 from further sensors, such as an airspeed indicator and input command sensors, among other sensors as may be suitable for controlling elevons 104 for stabilized flight.

Accordingly, the detect module 222, in one embodiment, controls the respective sensors to provide the data inputs in the form of the sensor data 216. Additionally, while the detect module 222 is discussed as controlling the various sensors to provide the sensor data 216, in one or more embodiments, the detect module 222 can employ other techniques to acquire the sensor data 216 that are either active or passive. For example, the detect module 222 may passively sniff the sensor data 216 from a stream of electronic information provided by the various sensors to further components within the aircraft 100. Moreover, the detect module 222 can undertake various approaches to fuse data from multiple sensors when providing the sensor data 216. Thus, the sensor data 216, in one embodiment, represents a combination of perceptions acquired from multiple sensors.

The command module 224, in one embodiment, includes instructions that cause the processor 218 to control an angle of an elevon 104 of the wing assembly based on the fuselage pitch attribute and the wing pitch angle. The command module 224 includes the hardware and software components to generate electrical signals that physically move the elevons 104 based on the sensor data 216. Specific examples of control of the elevon 104 by the command module 224 are provided below in connection with FIGS. 3-5.

In an example, the command module 224 provides control signals to the elevons 104 based on other information. For example, elevons 104 change the pitch and yaw angles of the aircraft 100 in hovering flight. Such changes are based on pilot inputs, whether the pilot is positioned in a cabin of the aircraft 100 or remote from the aircraft 100. Accordingly, the elevon control system 112 receives a wing attitude command for the wing assembly from a pilot and controls the angle of the elevon 104 based on the received wing attitude command. In another example, the wing attitude commands may be generated autonomously onboard the aircraft 100 without the pilot commanding the angle. As part of an autonomous flight control system, the wing angle may be autonomously controlled to achieve a certain flight speed, aircraft position, or other maneuver.

Moreover, the elevon control system 112, as provided for within the aircraft 100, functions in cooperation with a communication system 226. Via the communication system 226, the elevon control system 112 receives sensor data 216 from the sensor system 228 in accordance with the principles described herein. Moreover, via the communication system 226, control signals are transmitted to the elevons 104 in accordance with the principles described herein.

In an example, the communication system 226 includes a physical bus or buses to transmit information between connected components. In an example, the communication system 226 is a wireless system communicating with associated components according to one or more wireless communication standards. For example, the communication system 226 can include multiple different antennas/transceivers and/or other hardware elements for communicating at different frequencies and according to respective protocols. The communication system 226, in one arrangement, communicates via a communication protocol, such as a WiFi, DSRC, or another suitable protocol for communicating between the elevon control system 112 and other entities in the aircraft 100. In any case, the elevon control system 112 can leverage various wireless communication technologies to provide communications to other components of the aircraft 100.

FIG. 3 illustrates one embodiment of elevon control of a free-wing aircraft 100 to stabilize the free-wing aircraft fuselage 106. As described above, in horizontal or forward flight, the fuselage 106 is stabilized by airflow passing over the horizontal stabilizer 108. However, in a vertical flight mode, as depicted in FIG. 3, there is no airflow over the horizontal stabilizer 108 to stabilize the fuselage 106. Instead, the fuselage 106 hangs freely, susceptible to swinging back and forth about a pivot point 330. FIG. 3 depicts the center of mass 332 of the fuselage 106, the pivot point 330 of the wing 102, and the length dimension 336 of the wing 102. FIG. 3 also depicts the pitch angle 334 of a given body, which is defined as an angle of the longitudinal axis of the body relative to the horizon. In the instance depicted in FIG. 3, the fuselage 106 has a pitch angle of 0; that is, the fuselage 106 is parallel to the horizon.

FIG. 4 illustrates one embodiment of elevon control of a free-wing aircraft 100 to stabilize the free-wing aircraft fuselage 106. As described above, the fuselage 106 may rotate or pivot freely about the pitch axis 110 of the aircraft. For any number of reasons, including a pilot pitch command, the center of mass 332 of the fuselage 106 may shift forward. When a pitch of the fuselage 106 places the center of mass 332 of the fuselage 106 in front of the pivot point 330 of the wing assembly, the fuselage 106 swings to a nose-up position as indicated by the arrow 438. As described above, the swinging motion of the fuselage 106 may be determined by a fuselage pitch angle sensor or a pitch gyroscopic sensor.

Responsive to this detected swing, the elevon control system 112 sets the angle 440 of the elevon 104 such that the wing pitch angle decreases, as depicted by the arrow 442, to oppose the pitch of the fuselage 106. That is, when the fuselage 106 is in a nose-up position, the elevon control system 112 operates to move the pivot point 330 forward to cancel the upward motion of the fuselage 106 nose. The elevon control system 112 changes the angle 440 of the elevon 104 relative to the wing 102, as depicted in FIG. 4, to rotate the wing assembly forward, as depicted by the arrow 442. The forward orientation of the wing assembly also rotates the propeller thrust in a forward direction, causing the wing pivot point 330 to move forward. As such, the elevon control system 112 dampens the fuselage pitch rate to achieve a steady fuselage more quickly than an aircraft without a dampened fuselage pitch rate. In another example, the elevon control system 112 stabilizes the fuselage pitch angle to achieve a stabilized fuselage more quickly than an aircraft without a stabilized fuselage pitch angle.

FIG. 5 illustrates one embodiment of elevon control of a free-wing aircraft 100 to stabilize the free-wing aircraft fuselage 106. At the point in time depicted in FIG. 5, the center of mass 332 of the fuselage 106 has shifted backward. When a pitch of the fuselage 106 places the center of mass 332 of the fuselage 106 behind the pivot point 330 of the wing assembly, the fuselage 106 swings to a nose-down position as indicated by the arrow 544.

Responsive to this detected swing, the elevon control system 112 sets the angle 440 of the elevon 104 such that the wing pitch angle increases, as depicted by the arrow 546, to oppose the pitch of the fuselage 106. That is, when the fuselage 106 is in a nose-down position, the elevon control system 112 operates to move the pivot point 330 backward to cancel the downward motion of the fuselage 106 nose. The elevon control system 112 changes the angle 440 of the elevon 104 relative to the wing 102, as depicted in FIG. 5, to rotate the wing assembly backward, as depicted by the arrow 546. The rearward orientation of the wing assembly also rotates the propeller thrust in a backward direction, causing the wing pivot point 330 to move backward. As such, the elevon control system 112 dampens the fuselage pitch rate to achieve a steady fuselage more quickly than an aircraft without a dampened fuselage pitch rate. In another example, the elevon control system 112 stabilizes the fuselage pitch angle to achieve a stabilized fuselage more quickly than an aircraft without a stabilized fuselage pitch angle.

The operations depicted in FIGS. 4 and 5 may be repeated as the aircraft 100 swings about a pitch axis such that elevon control dampens, opposes, or cancels the natural swinging motion of the fuselage 106, thus bringing the fuselage 106 to an equilibrium position more quickly than if the fuselage pitch were not damped.

Additional aspects of fuselage stabilization will be discussed in relation to FIG. 6. FIG. 6 illustrates a flowchart of a method 600 that is associated with elevon 104 control to stabilize a fuselage 106 while in a vertical flight mode. Method 600 will be discussed from the perspective of the elevon control system 112 of FIGS. 1A, 1B, and 2. While method 600 is discussed in combination with the elevon control system 112, it should be appreciated that the method 600 is not limited to being implemented within the elevon control system 112 but is instead one example of a system that may implement the method 600. For example, the method 600 may be implemented with analog control systems (whether mechanical or electrical) to control fuselage stabilization via wing pitch control.

At 610, the detect module 222 controls the sensor system 228 to measure a fuselage pitch attribute for an aircraft 100 for which the wing assembly and fuselage 106 rotate independently about a pitch axis. At 620, the detect module 222 controls the sensor system 228 to measure a wing pitch angle of the wing assembly. The detect module 222 controls the sensor system 228 to acquire the sensor data 216. In one embodiment, the detect module 222 controls the fuselage pitch sensor and the wing pitch sensor of the aircraft 100 to observe the fuselage pitch attribute (e.g., fuselage pitch angle, fuselage pitch rate) and the wing pitch attribute (e.g., wing pitch angle, wing pitch rate), respectively. Thus, the detect module 222, in one embodiment, controls the sensors to acquire the sensor data 216 of the surrounding environment and the aircraft 100.

Moreover, in further embodiments, the detect module 222 controls the sensors to acquire the sensor data 216 at successive iterations or time steps. Thus, the elevon control system 112, in one embodiment, iteratively executes the functions discussed at blocks 610-630 to acquire the sensor data 216 and provide information therefrom. Furthermore, the detect module 222, in one embodiment, executes one or more of the noted functions in parallel for separate observations in order to maintain updated perceptions.

At 630, the elevon control system 112, and more particularly the command module 224, controls an angle of the elevon 104 of the wing assembly based on the fuselage pitch attribute and the wing pitch attribute. That is, the elevon control system 112 receives as input the fuselage pitch attribute and the wing pitch attribute, along with any wing attitude command, and adjusts the elevons 104 as described above in connection with FIGS. 4 and 5, to oppose, cancel, and/or dampen the relevant pitch attribute of the fuselage 106 while the aircraft 100 is in a vertical flight mode, which vertical flight mode includes vertical flight and hovering. While in the horizontal wing mode, elevon control based on fuselage pitch may be disengaged such that elevon control is instead based on just wing pitch attributes and wing attitude commands to stabilize the wing in forward flight and carry out any intended flight maneuvers, while fuselage stabilization is provided by the horizontal stabilizer 108 on the fuselage 106.

Figure 7:
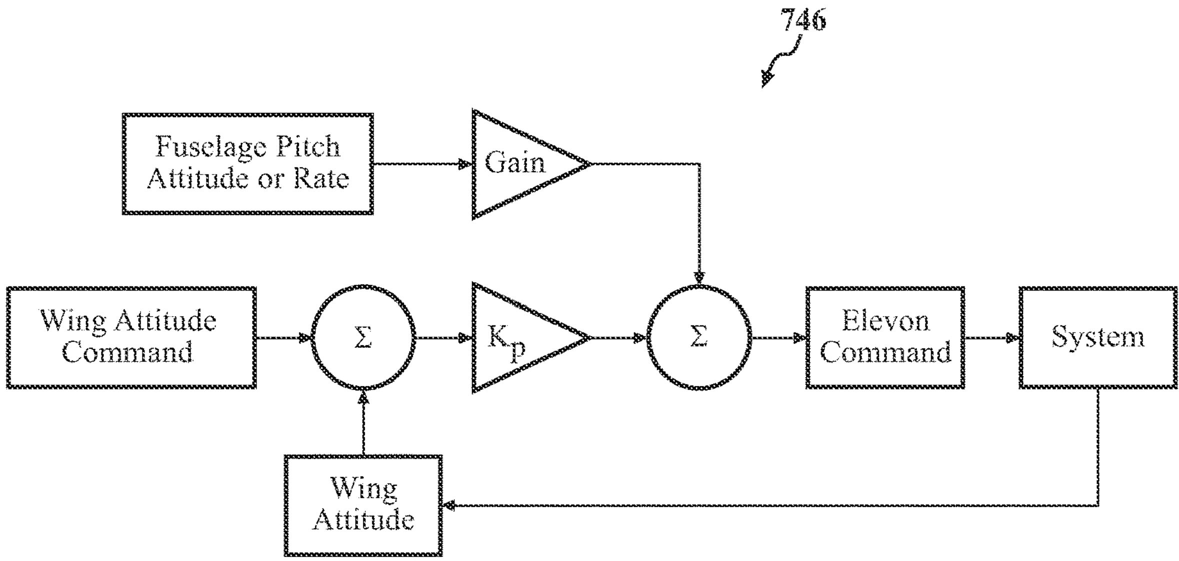
FIG. 7 illustrates a diagram of a control loop of the elevon control system that is associated with stabilizing a free-wing aircraft fuselage.

FIG. 7 illustrates a diagram of a control loop 746 of the elevon control system 112 that is associated with stabilizing a free-wing aircraft fuselage 106. As described above, wing attitude command is received from a pilot, whether an onboard pilot or a command from a remote pilot, such as if the aircraft 100 is a drone. In horizontal flight mode, the wing attitude command is combined with a wing attitude error term derived from the wing pitch attribute measured by the wing pitch sensor. These two values are combined and processed to generate an elevon command that is transmitted to the elevons 104 to control their physical angle relative to a length dimension 336 of the wing 102.

In a vertical flight mode, a fuselage pitch attribute, i.e., a fuselage pitch attitude or a fuselage pitch rate, is received and multiplied by some gain factor. This processed fuselage pitch attribute signal is combined, or summed, with the wing attitude command and wing attitude measurement, as depicted in FIG. 7, to generate the elevon command. As such, the elevon command accounts not only for wing attitude commands from a pilot and stabilizes the wing 102 by way of the wing attitude term, but also stabilizes the fuselage 106 by way of the fuselage pitch term. Fuselage stabilizing elevon control entails processing an additional term to the loop, i.e., the fuselage pitch attribute term. The workload of the elevon 104 is decreased despite the added term, as accounting for an undamped swinging of the fuselage 106 generates more workload for the elevons 104 than processing the fuselage pitch attribute command.

In this way, the disclosed systems, methods, and other embodiments improve free-wing aircraft fuselage stabilization while reducing part count, weight, drag, and operational complexity as compared to other configurations. Specifically, the elevons 104 are controlled to stabilize not only the wing assembly but the fuselage 106 as well, all while reducing the overall workload of the elevons 104 compared to an undamped or unstabilized fuselage.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. The systems, components, and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
- a processor; and
- a memory storing machine-readable instructions that, when executed by the processor, cause the processor to:
  - measure a fuselage pitch attribute of an aircraft, wherein a fuselage and a wing assembly of the aircraft freely rotate about a pitch axis of the aircraft independently of one another;
  - measure a wing pitch angle of the wing assembly; and
  - control, during a vertical flight mode, an angle of an elevon of the wing assembly based on the fuselage pitch attribute and the wing pitch angle, whereby pitching motion of the fuselage is canceled by rotating the wing assembly forward or back about the pitch axis.

2. The system of claim 1, wherein the machine-readable instruction to control the angle of the elevon stabilizes the fuselage when the aircraft is in a vertical flight mode.

3. The system of claim 1, wherein:
- the machine-readable instructions further comprise an instruction that, when executed by the processor, causes the processor to determine when the aircraft is in a horizontal flight mode or a vertical flight mode;
- the machine-readable instruction to control the angle of the elevon comprises an instruction that, when executed by the processor, causes the processor to, when in the horizontal flight mode, control the angle of the elevon based on the wing pitch angle without the fuselage pitch attribute; and
- the machine-readable instruction to control the angle of the elevon comprises an instruction that, when executed by the processor, causes the processor to, when in the vertical flight mode, control the angle of the elevon based on the wing pitch angle and the fuselage pitch attribute.

4. The system of claim 3, wherein the machine-readable instruction to determine when the aircraft is in the horizontal flight mode comprises an instruction that, when executed by the processor, causes the processor to determine that the aircraft is in the horizontal flight mode when an airspeed of the aircraft is greater than a predetermined value.

5. The system of claim 3, wherein the machine-readable instruction to determine when the aircraft is in the horizontal flight mode comprises an instruction that, when executed by the processor, causes the processor to determine that the aircraft is in the horizontal flight mode when the wing pitch angle of the wing assembly is less than a predetermined value.

6. The system of claim 1, wherein the machine-readable instructions further comprise an instruction that, when executed by the processor, causes the processor to incrementally decrease a weight of the fuselage pitch attribute in elevon control as the aircraft transitions from a vertical flight mode to a horizontal flight mode.

7. The system of claim 1, wherein:
- the fuselage pitch attribute is a fuselage pitch rate; and
- the machine-readable instruction to control the angle of the elevon of the wing assembly cancels a swing of the fuselage when the aircraft is in a vertical flight mode.

8. The system of claim 1, wherein:
- the fuselage pitch attribute is a fuselage pitch angle; and
- the machine-readable instruction to control the angle of the elevon of the wing assembly positions the fuselage at a predetermined pitch angle.

9. The system of claim 1, wherein the machine-readable instruction to control the angle of the elevon comprises an instruction that, when executed by the processor, causes the processor to, when a pitch of the fuselage places a center of mass of the fuselage in front of a pivot point of the wing assembly, set the angle of the elevon such that the wing pitch angle decreases to oppose the pitch of the fuselage.

10. The system of claim 1, wherein the machine-readable instruction to control the angle of the elevon comprises an instruction that, when executed by the processor, causes the processor to, when a pitch of the fuselage places a center of mass of the fuselage behind a pivot point of the wing assembly, set the angle of the elevon such that the wing pitch angle increases to oppose the pitch of the fuselage.

11. The system of claim 1, wherein:
- the machine-readable instructions further comprise an instruction that, when executed by the processor, causes the processor to receive a wing attitude command; and
- the machine-readable instruction to control the angle of the elevon further comprises an instruction that, when executed by the processor, causes the processor to control the angle of the elevon based on the wing attitude command.

12. The system of claim 1, wherein the machine-readable instruction to control the angle of the elevon comprises an instruction that, when executed by the processor, causes the processor to control, based on the fuselage pitch attribute and the wing pitch attribute, the angle of the elevon of the wing assembly to rotate a propeller thrust direction.

13. A non-transitory machine-readable medium comprising machine-readable instructions that, when executed by a processor, cause the processor to:
- measure a fuselage pitch rate of an aircraft while in a vertical flight mode, wherein a fuselage and wing assembly of the aircraft freely rotate about a pitch axis of the aircraft independently of one another;

measure a wing pitch angle of the wing assembly; and adjust a wing assembly pitch by controlling, during a vertical flight mode, an angle of an elevon of the wing assembly based on the fuselage pitch rate and the wing pitch angle, wherein an adjustment of the wing assembly pitch dampens the fuselage pitch rate, whereby pitching motion of the fuselage is canceled by rotating the wing assembly forward or back about the pitch axis.

14. The non-transitory machine-readable medium of claim 13, wherein:

the machine-readable instructions further comprise an instruction that, when executed by the processor, causes the processor to determine when the aircraft is in a horizontal flight mode; and the machine-readable instruction to control the angle of the elevon comprises an instruction that, when executed by the processor, causes the processor to, when in the horizontal flight mode, control the angle of the elevon based on the wing pitch angle without the fuselage pitch rate.

15. The non-transitory machine-readable medium of claim 13, wherein the machine-readable instructions further comprise an instruction that, when executed by the processor, causes the processor to incrementally decrease a weight of the fuselage pitch rate in elevon control as the aircraft transitions from a vertical flight mode to a horizontal flight mode.

16. A method, comprising:

measuring a fuselage pitch attribute of an aircraft, wherein a fuselage and wing assembly of the aircraft freely rotate about a pitch axis of the aircraft independently of one another;

measuring a wing pitch angle of the wing assembly; and controlling, during a vertical flight mode, an angle of an elevon of the wing assembly based on the fuselage pitch attribute and the wing pitch angle, wherein the controlling stabilizes the wing assembly and the fuselage when the aircraft is in a vertical flight mode, whereby pitching motion of the fuselage is canceled by rotating the wing assembly forward or back about the pitch axis.

17. The method of claim 16, wherein:

measuring the fuselage pitch attribute comprises measuring a fuselage pitch rate; and controlling the angle of the elevon comprises cancelling a swing of the fuselage when the aircraft is in the vertical flight mode.

18. The method of claim 16:

further comprising determining when the aircraft is in a horizontal flight mode; and wherein controlling the angle of the elevon comprises, when in the horizontal flight mode, controlling the angle of the elevon based on the wing pitch angle without the fuselage pitch attribute.

19. The method of claim 16, further comprising:

when a center of mass of the fuselage is in front of a pivot point of the wing assembly, controlling the angle of the elevon to decrease the wing pitch angle; and when the center of mass of the fuselage is behind the pivot point of the wing assembly, controlling the angle of the elevon to increase the wing pitch angle.

20. The method of claim 16:

further comprising receiving a wing attitude command for the wing assembly; and wherein controlling the angle of the elevon is based on the wing attitude command.

* * * * *